United States Patent
Kim et al.

(10) Patent No.: US 11,392,972 B2
(45) Date of Patent: Jul. 19, 2022

(54) ELECTRONIC DEVICE FOR PROVIDING PRODUCT SALE MANAGING INFORMATION AND METHOD THEREOF

(71) Applicant: Coupang Corp., Seoul (KR)

(72) Inventors: Do Hyeon Kim, Seoul (KR); Ji Hoon Kim, Seoul (KR); Chang Hyun Lee, Seoul (KR); Young Jin Kim, Seoul (KR); Suk Min Ahn, Seoul (KR)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 17/010,728

(22) Filed: Sep. 2, 2020

(65) Prior Publication Data

US 2022/0005061 A1    Jan. 6, 2022

(30) Foreign Application Priority Data

Jul. 6, 2020 (KR) .................. 10-2020-0082908

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0222* (2013.01); *G06Q 30/0239* (2013.01); *G06Q 30/0601* (2013.01)

(58) Field of Classification Search
CPC ............. G06Q 30/0207–0277; G06Q 30/0601
See application file for complete search history.

(56) References Cited

U.S. PATENT DOCUMENTS

| | | | |
|---|---|---|---|
| 2006/0155616 A1* | 7/2006 | Moore | G06Q 30/0283 705/30 |
| 2007/0112614 A1* | 5/2007 | Maga | G06Q 30/02 705/7.33 |
| 2014/0149183 A1* | 5/2014 | Liu | G06Q 30/0206 705/7.35 |
| 2018/0300980 A1* | 10/2018 | Iwamura | G06Q 30/0235 |
| 2019/0236545 A1 | 8/2019 | Umezu et al. | |
| 2020/0043027 A1* | 2/2020 | Bhasin | G06Q 30/0206 |
| 2021/0035142 A1 | 2/2021 | Kang et al. | |

(Continued)

FOREIGN PATENT DOCUMENTS

| CN | 104463638 A | 3/2015 |
|---|---|---|
| CN | 106408341 A | 2/2017 |
| CN | 106971318 A | 7/2017 |

(Continued)

OTHER PUBLICATIONS

International Search Report for PCT/KR2020/010330 dated Apr. 5, 2021.

*Primary Examiner* — Raquel Alvarez
*Assistant Examiner* — Christopher Stroud
(74) *Attorney, Agent, or Firm* — Knobbe, Martens, Olson & Bear, LLP

(57) ABSTRACT

Provided is an information providing method of an electronic apparatus, the method including identifying sales information of an item that is for sale through the network, identifying whether it is necessary to provide item sales management information based on the identified sales information of the item, and, when it is necessary to provide the item sales management information, providing the item sales management information generated based on the sales information of the item.

7 Claims, 9 Drawing Sheets

(56) References Cited

U.S. PATENT DOCUMENTS

2021/0073887 A1\* 3/2021 Boo .................. G06Q 30/0643

FOREIGN PATENT DOCUMENTS

| | | |
|---|---|---|
| CN | 107203904 A | 9/2017 |
| CN | 108038251 A | 5/2018 |
| JP | 2000-132748 A | 5/2000 |
| JP | 2001-297105 A | 10/2001 |
| JP | 2001-312620 A | 11/2001 |
| JP | 2010-176342 A | 8/2010 |
| JP | 2015-041121 A | 3/2015 |
| JP | 2017-072870 A | 4/2017 |
| JP | 2018-181051 A | 11/2018 |
| JP | 2019-508806 A | 3/2019 |
| JP | 2019-144619 A | 8/2019 |
| KR | 10-2006-0098134 A | 9/2006 |
| KR | 10-2010-0130664 A | 12/2010 |
| KR | 10-2013-0119580 A | 11/2013 |
| KR | 10-1494198 B1 | 2/2015 |
| KR | 10-2016-0073364 A | 6/2016 |
| KR | 10-2017-0076099 A | 7/2017 |
| KR | 10-1870329 B1 | 6/2018 |
| KR | 10-1872220 B1 | 6/2018 |
| KR | 10-2019-0096869 A | 8/2019 |
| KR | 10-2019-0122458 A | 10/2019 |
| WO | WO 2015147496 A1 | 10/2015 |
| WO | WO 2018/042950 A1 | 3/2018 |

\* cited by examiner

FIG. 5

| Category | Status | Cause | Time | Item identification number | Item information | Link information | Manager information | Feedback |
|---|---|---|---|---|---|---|---|---|
| Digital | Profit rate reduced by 582% | Profit rate: [-2,493Won → -17,010Won]<br>Sales Price: [186,507Won → 171,990Won]<br>Expected sales volume: [15.43Unit → 39.27Unit]<br>Expected loss amount: 570,117Won | 2020-06-09 15:55 | 123456789 | 'KK' Tablet | Sales status | TeamA(JENNY) | GOOD |
| | | | | | | Price change | TeamA(RINDA) | BAD |
| | | | | | | Distribution information | TeamB(JAKE) | |
| | | | | | | Sales management | | |

FIG. 7

| Date | Price | Quantity | Price to be changed | Market price | Delivery fee | Discount price | Modifie |
|---|---|---|---|---|---|---|---|
| 20/06/08 13:00:00 | 17,700 | 3150 | 17,200 | 17,200 | 0 | 740 | System |
| 20/06/08 12:50:00 | 17,400 | 3150 | 17,700 | 17,700 | 2000 | 0 | A |

FIG. 8

| Category authority inquiry | | | | | Reset filter | Filter ▲ |
|---|---|---|---|---|---|---|
| Unit 1 | - | | Unit 2 | - | | ⌄ |
| User type | - | | User ID | Enter user ID | | |
| | | | | | Create | Search |

| Team | Manager | Unit 1 | Unit2 | Creator | Created date | |
|---|---|---|---|---|---|---|
| A | JENNY | Kitchen | Kitchen Appliance | MAYA | 2020-06-03 10:06:80 | Delete |
| B | JAKE | Kitchen | Kitchen Disposable | MAYA | 2020-05-29 10:05:02 | Delete |

FIG. 9

| VendorItem | | Product/Item | 281467110/817573097 |
|---|---|---|---|
| SKU | General Item Croissant 240g, 2 packs | Sales status | Valid | General Item | QChistory |
| | Croissant 240g, 2 packs | | |

Sales information                                                                 *Required field Sales price *            [7630]    [Won]

Cost/Online sales price  [    ]    [Won]  ☒ No cost

Sales period *           [2019/07/16 18:24:37] ~ [2999/12/31 23:59:00]   [1Week] [1Month] [2999]

Maximum sales quantity                         [    ] [Units] ☒ Not limited

Maximum purchase quantity per person           [30]   [Units] ☒ Not limited

Maximum purchase period per person             [1]    [Days] ☒ Not limited

Sales status             ⦿ Valid  ○ Invalid
                         Enter reason for invalid sales Whether or not Pre-Order  ○ Yes  ⦿ No Pre-Order quantity       [0]    [Units]

Pre-Order sales start date ~ end date   [Pre-Order sales start date] ~ [Pre-Order sales end date]

Pre-Order release date   [Pre-Order release date]

ELECTRONIC DEVICE FOR PROVIDING PRODUCT SALE MANAGING INFORMATION AND METHOD THEREOF

BACKGROUND

Technical Field

The present disclosure relates to an electronic apparatus for providing item sales management information based on sales information of an item, and a method thereof.

Description of the Related Art

As the use of the Internet has become universe, e-commerce is growing. In e-commerce, a variety of information on or regarding items is provided online, and transactions are made through a network. Specifically, a customer places an order for an item based on identifying information on the item online, and a seller of the item delivers the item to the customer based on acquiring information on the order.

In such an e-commerce transaction, there may be a gap between a time point when the customer places the order for the item and a time point when the seller acquires the information on or regarding the order. For example, at a specific time point in a day, the seller may check orders of items placed before the specific time point, so that the items are provided to the customer. In this case, even if there is an error in information on online items and wrong orders are continuously placed, the seller may recognize the wrong orders later, which may lead to a loss due to the wrong orders and lead to a failure to provide the items to the customer, thereby inconvenience.

SUMMARY

Technical Goals

An aspect provides an electronic apparatus and a method thereof, the apparatus for identifying a situation associated with sale of an item based on sales information of the item and providing item sales management information, thereby effectively managing the sale of the item.

Technical goals of the present disclosure are not limited to the above-mentioned goal, and other goals and advantages of the present disclosure which are not mentioned herein could be understood by the following embodiments.

Technical Solutions

According to a first embodiment, there is provided an information providing method of an electronic apparatus, the method including identifying sales information of an item that is for sale through a network, identifying, based on the identified item sales information, whether it is necessary to provide item sales management information, and, when it is necessary to provide the item sales management information, providing the item sales management information generated based on the sales information of the item.

According to a second embodiment, there is provided an electronic apparatus including a memory configured to store an instruction(s), and a processor, and the processor is connected to the memory to identify sales information of an item that is for sale through a network, identify, based on the identified sales information of the item, whether it is necessary to provide item sales management information, and, when it is necessary to provide the item sales management information, providing the item sales management information generated based on the sales information of the item.

According to a third embodiment, there is provided a non-transitory recording medium readable by a computer which stores, when executed by a computer, a program for implementing an information providing method of an electronic apparatus, and the method includes identifying sales information of an item that is for sale through a network, identifying, based on the identified item sales information, whether it is necessary to provide item sales management information, and, when it is necessary to provide the item sales management information, providing the item sales management information generated based on the sales information of the item.

Details of other embodiments are included in the detailed description and drawings.

Effects

According to the present disclosure, an electronic apparatus and a method thereof may identify a situation of selling an item based on sales information of the item to provide item sales management information depending on the situation, thereby effectively managing the sale of the item.

In addition, the electronic apparatus and the method thereof may detect an abnormal situation associated with sale of an item based on sales information of the item to provide item sales management information, thereby preventing an error that possibly occurs due to the abnormal situation.

Effects are not limited to the aforementioned effects, and other effects not mentioned will be clearly understood by those skilled in the art from the description of the claims.

BRIEF DESCRIPTION OF THE DRAWINGS

FIG. 5 is a diagram illustrating an example of item sales management information provided by an electronic apparatus according to an embodiment.

FIG. 7 is a diagram illustrating another example of information associated with a sales price of an item among item sales management information provided by an electronic apparatus according to an embodiment.

FIG. 8 is a diagram illustrating an example of information associated with a manager among item sales management information provided by an electronic apparatus according to an embodiment.

FIG. 9 is a diagram for describing a case where sale of an item is managed based on item sales management information provided from an electronic apparatus according to an embodiment.

DETAILED DESCRIPTION

Terms used in embodiments are selected among common terms that are currently widely used in consideration of their functions in the present disclosure, but the terms may be different according to an intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the specification, when a part is said to "include" a certain component, which means that it may further include other components, except to exclude other components unless otherwise stated.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or mobile terminal capable of accessing a server or another terminal over a network. Here, the computer includes, for example, a laptop equipped with a web browser, a desktop, a laptop, and the like, and the mobile terminal is, for example, wireless communication device assuring portability and mobility and may include any type of handheld-based wireless communication devices like communication-based terminals, which is based on International Mobile Telecommunication (IMT), Code Division Multiple Access (CDMA), W-Code Division Multiple Access (W-CDMA), Long Term Evolution (LTE), smart phones, tablet PCs, and the like.

Hereinafter, embodiments of the present disclosure will be described in detail with reference to the accompanying drawings so that those skilled in the art can easily carry out the present disclosure. However, the present disclosure may be implemented in various different forms but it is not limited to the exemplary embodiments described hereinafter.

Hereinafter, embodiments of the present disclosure will be described in detail with reference to the drawings.

Figure 1:
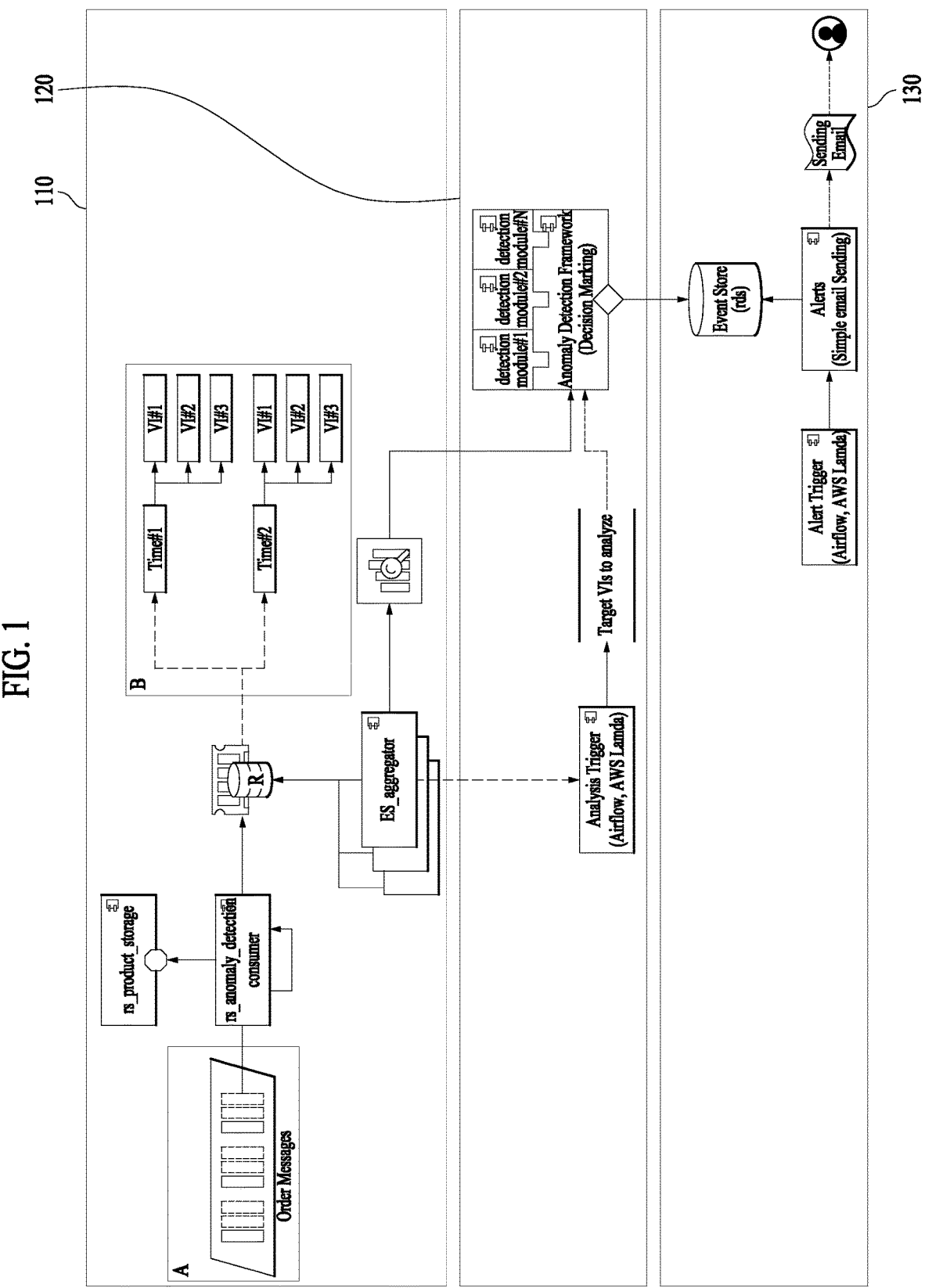
FIG. 1 is a conceptual diagram illustrating a method of providing information by an electronic apparatus according to an embodiment.

FIG. 1 is a conceptual diagram illustrating a method of providing information by an electronic apparatus according to an embodiment. Specifically, a first part 110 of FIG. 1 relates to a process for acquiring sales information of an item, a second part 120 relates to a process for identifying, based on the sales information of the item, whether it is necessary to provide item sales management information, and a third part 130 relates to a process for providing the item sales management information.

Referring to A of the first part 110, an electronic apparatus may acquire sales information of an item. In an embodiment, the electronic apparatus may acquire the sales information of the item in real time in response to an order for the item. In another embodiment, the electronic apparatus may acquire the sales information of the item at a specific time interval (e.g., 5 minutes). In this case, as shown in B of the first part 1, information (e.g., VI #1, VI #2, VI #3) on orders for an item placed for a specific time (e.g., Time #1, Time #2) may be accumulated and grouped, and then transmitted to the electronic apparatus on a unit basis of a predetermined time, and accordingly, the sales information of the item may be acquired by the electronic apparatus.

The sales information of the item may include a variety of information on or regarding the item which is ordered. For example, the sales information of the item may include information on at least one of: a sales price of the item, a sales volume of the item, a discount rate of the item, and a margin of the item. However, the present disclosure is not limited thereto, and according to an embodiment, information on or regarding at least one of the following may be included: an identifier of the item, a discount price of the item, a category of the item, a selling time of the item, and a delivery fee of the item.

The sales information of the item may include, for example, information on or regarding a time when an item was sold, a category of the item, an identifier of the item, and a sales price of the item, as shown in the following table.

TABLE 1

| Sales time | Item category | Item identifier | Sales price |
|---|---|---|---|
| 2020 May 09 15:00 | Toy | A | 10,000 |
| 2020 May 09 15:02 | Toy | A | 15,000 |
| 2020 May 09 15:04 | Toy | A | 20,000 |

The sales information of the item may be aggregated and displayed on a unit basis of a specific time, and, in this case, aggregated data may be displayed as shown in the following table. Here, the sales price may be an average of sales prices of the item sold for a specific time (e.g., 5 minutes).

TABLE 2

| Sales time | Item category | Item identifier | Sales price | Sales volume |
|---|---|---|---|---|
| 2020 May 09 15:05 | Toy | A | 15,000 | 3 |

However, this is only an example and the present embodiment is not limited to this example.

In an embodiment, the electronic apparatus may store predetermined information associated with the item in an operation corresponding to "rs_item_storage" in the first part 110. The stored information may be used to determine whether to provide item sales management information which will be described later. The predetermined information associated with the item may include, for example, a cost of the item and an average margin of the item (a difference between the sales price and the cost) for a predetermined period. Meanwhile, in an embodiment, a factor such as the average margin may be a numerical value related to profits considered by a seller based on costs used for sales and purchase of the item.

In an embodiment, the electronic apparatus may manage the item sales information in an operation corresponding to the "ES_aggregator" of the first part 110. For example, the electronic apparatus may generate a distribution (e.g., a sales price distribution and a margin distribution) used to determine whether to provide the item sales management information which will be described later. The generated distribution may be used later to determine whether to provide the item sales management information.

Referring to the second part 120, the electronic apparatus may determine whether it is necessary to provide the item sales management information using the acquired sales information. In an embodiment, the electronic apparatus may determine whether it is necessary to provide the item sales management information, based on whether the item sales information satisfies a predetermined criterion. The predetermined criterion may include, for example, at least one of: whether a revenue from sale of the item is included in a predetermined range; whether a sales price of the item is included in a specific region within a predetermined price distribution; and whether a margin of the item is included in a specific region within a predetermined margin distribution. A more detailed description thereof will be described later.

In an embodiment, a determination as to whether to provide the item sales management information may be made by the electronic apparatus in an operation corresponding to the "Anomaly Detection Framework" of the second part 120. Each of "detection module #1, detection module #2, and detection module #3" in the second part 120 may correspond to different criterions for determining whether it is necessary to provide the item sales management information. According to an embodiment, the electronic apparatus may determine whether it is necessary to provide the item sales management information, using at least one of the above-described different criterions. The different criterions for determining whether it is necessary to provide the item sales management information may be predetermined and a more detailed description thereof will be described later.

In an embodiment, the electronic apparatus may classify the item sales information at a specific time interval in an operation corresponding to "Analysis Trigger" in the second part 120. The classified sales information may be used to determine whether to provide the aforementioned item sales management information.

Referring to the third part 130, when it is determined that it is necessary to provide the item sales management information, the item sales management information may be provided to a user. The item sales management information may include, for example, at least one of: a sales price change information of an item; sales status information of the item; distribution information of the item; seller information of the item; sales control information of the item; a sales price of the item; page link information for modifying the sales status information of the item; and manager information of the item.

For example, the sales price change information of the item may include at least one of: information on or regarding change of an item price; information on a cause for the change for the item price; and a price before and after the change. More specifically, for example, the information on the change is information on change of a price over time and may be expressed as at least one of a graph, a table, an image, and a text, and FIG. 5 or 6 may be referred for a specific example related thereto. The information on the cause for the change of the item price may include information on which object (e.g., a system, a manager) that has caused the change of the item price.

The sales status information of the item may include at least one of: information on a screen displayed on a webpage for a current price of an item and sale of the item; and information on whether the item is sold out or still available for sale. The distribution information of the item may include, for example, information on at least one of: a category of the item, a type of the item, a quantity of the item sold, and a name of the item. The seller information of the item may include, for example, information indicating a seller of the item, and the item sales control information may include information associated with sale of the item or information for changing a status. The page link information for modifying the sales status information of the item may include, for example, link information to access a webpage when an additional webpage is required to change the sales status of the item (e.g., sold-out, available for sale).

In an embodiment, in response to a determination that it is necessary to provide the item sales management information, the electronic apparatus may trigger provision of the item sales management information through "Alert Trigger" operation in the third part 130. The electronic apparatus may acquire and provide the item sales management information through "Alerts" operation based on the triggering.

In an embodiment, the item sales management information may be provided in the form of an email as shown in "Sending Email" operation in the third part 130, but not limited thereto, and the item sales management information may be provided in various ways such as a text message or a notification message.

Meanwhile, the order indicated by arrows in FIG. 1 may indicate preceding and following processes, but the present embodiment is not limited thereto, and, according to an embodiment, the preceding and following processes may be performed regardless of the illustrated example.

Figure 2:
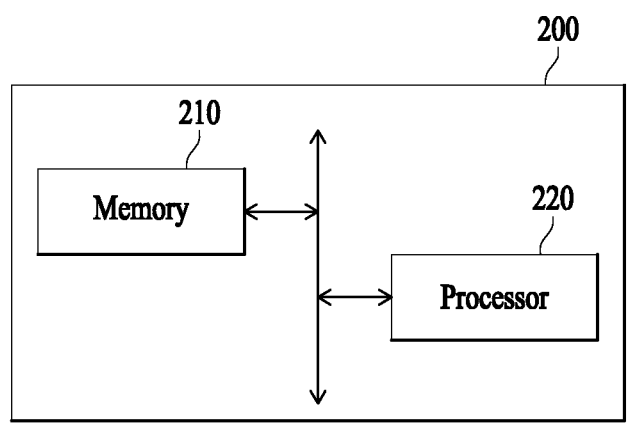
FIG. 2 is a functional block diagram of an electronic apparatus according to an embodiment.

FIG. 2 is a functional block diagram of an electronic apparatus according to an embodiment. Although elements related to the present embodiment are shown in FIG. 2, the present disclosure is not limited thereto, and other general-purpose elements may be further included in addition to the elements shown in FIG. 2.

Referring to FIG. 2, the electronic apparatus 200 may include a memory 210 and a processor 220. Each element shown in FIG. 2 refers to a unit that processes at least one function or operation, which may be implemented by hardware or software, or a combination of hardware and software.

According to an embodiment, the electronic apparatus 200 of FIG. 2 may be implemented as a server, and the present specification is not limited by an implementation method of the electronic apparatus 200.

The memory 210 may store a variety of data associated with the electronic apparatus 200. For example, the memory 210 may store at least one instruction for an operation of the electronic apparatus 200. In this case, the processor 220 may perform various operations based on instructions stored in the memory 210.

The processor 220 may control overall operations of the electronic apparatus 200. For example, the processor 220 may control the operation of the electronic apparatus 200 by controlling elements of the electronic apparatus 200 based on instructions stored in the memory 210.

The processor 220 may identify sales information of an item that is for sale through a network. The item is for sale based on e-commerce, and the processor 220 may identify sales information of the item based on sale of the item.

For example, the processor 220 may identify, at a specific time interval (e.g., 5 minutes), sales information of an item that is sold for a specific time. Specifically, for example, the processor 220 may identify, at a time interval of 5 minutes, sales information of an item that is sold for 5 minutes. In another example, in response to completion of sale of an item, the processor 220 may identify sales information of the item.

The sales information of the item may include, for example, at least one of: a sales price of the item, a sales volume of the item, a discount rate of the item, and a margin of the item. However, the present embodiment is not limited to this example, and, for example, information on a time when the item is sold may be further included.

In an embodiment, the processor 220 may acquire, based on the sale of the item, the sales information from a server associated with the sale of the item. Specifically, the processor 220 may be connected to a server for driving a website for selling the item, and may acquire the sales information of the item based on the connection.

In some cases, when the electronic apparatus 200 is implemented to include the server, the processor 220 may identify, based on the sale of the item, the sales information of the item.

The processor 220 may identify whether it is necessary to provide item sales management information, based on the sales information of the item. In an embodiment, the processor 220 may identify whether the sale of the item satisfies a predetermined criterion, based on identifying the sales information of the item. When the sale of the item satisfies the predetermined criterion, the processor 220 may determine that it is necessary to provide the item sales management information. The predetermined criterion may be, for example, a criterion predetermined based on at least one of: a sales price, a profit rate, an expected sales volume, a margin, a revenue, and a sales volume of the item. Here, the margin refers to a difference between the sales price and a cost of the item, and the revenue may refer to a sum of margins of one or more items or may refer to a sales profit obtained by selling an item.

In some cases, the processor 220 may determine that an abnormal sign associated with the sale of the item has occurred when the sale of the item satisfies the predetermined criterion. The abnormal sign indicates a sign different from a normal situation, and may include, for example, a situation in which the sale of the item sharply decreases or surges, unlike in the normal situation, or a situation in which a margin (or a revenue, a profit rate) of selling the item plummets.

In an embodiment, based on the sales information of the item, the processor 220 may identify at least one of: a sales price of the item and a sales volume of the item. The processor 220 may identify an expected sales volume of the item based on a quantity of the item sold for a reference time. Specifically, the processor 220 may analyze the quantity of the item sold for the reference time according to a predetermined statistical result to identify an expected sales volume for a day. For example, in a case where a quantity of the item sold from 14:00 to 14:05 is 10 based on the sales information of the item and an expected sales volume of the item according to a predetermined statistical result is 100 times the quantity of the item sold from 14:00 to 14:05, the expected sales volume of the item for a day may be identified as 1000. However, this is merely an example and the present embodiment is not limited to this example, and the expected sales volume may be identified in various ways. Meanwhile, in an embodiment, a reference time for monitoring whether the item is for sale may be variably set based on a type of the item for sale, a selling time of the item, and a price related to the sale of the item. In addition, a different reference time may be applied depending on an algorithm applied according to an embodiment of the present specification.

Figure 4:
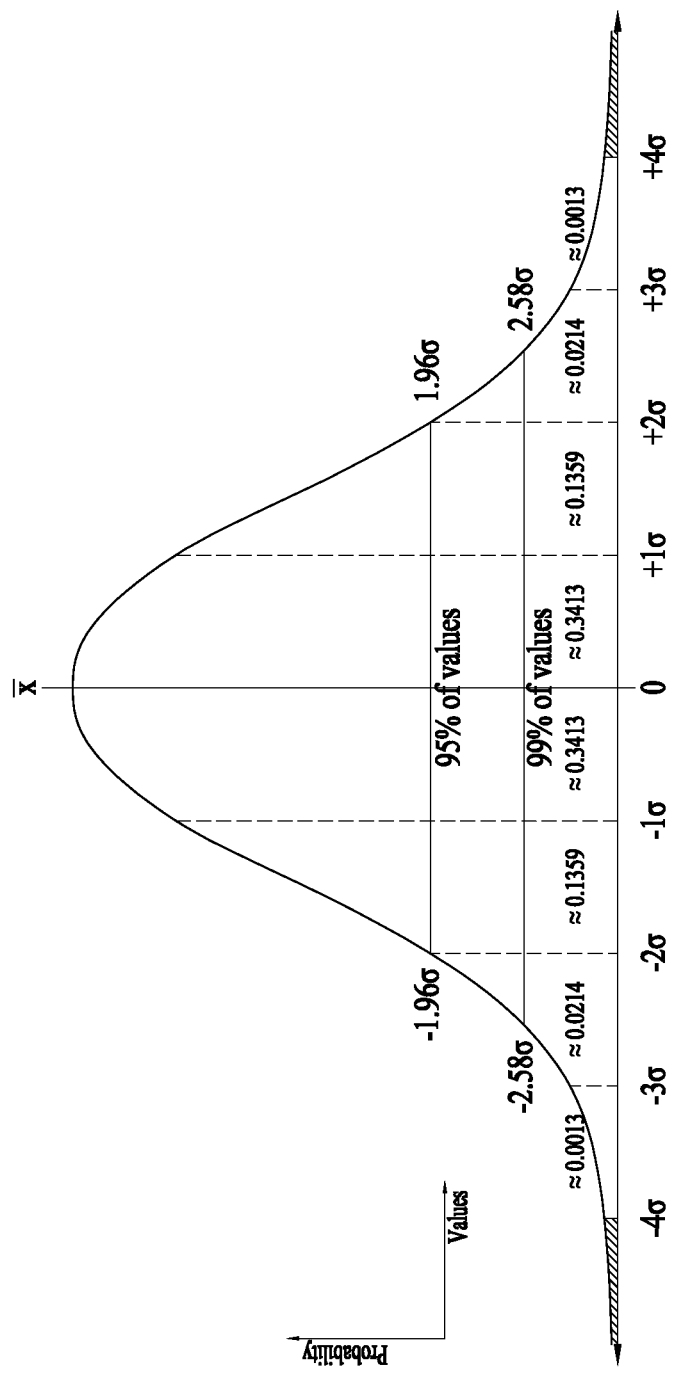
FIG. 4 is a diagram illustrating distribution for determining whether to provide item sales management information by an electronic apparatus according to an embodiment.

In one embodiment, the processor 220 may identify a distribution (or a distribution graph, a normal distribution graph, distribution information) of the sales price of the item, the distribution which is generated based on a sales history of the item for a specific period (e.g., one week). The processor 220 may identify whether the price of the item corresponding to the sales information is included in a specific range within the distribution. When the price of the item is out of the specific range, the processor 220 may identify the expected sales volume of the item. For example, a distribution of average sales prices of the item for one week may be stored in advance, and when the sales price is identified, the processor 220 may identify a position of the identified sales price in the distribution. The processor 220 may identify whether the position corresponding to the identified sales price is included in a specific range within the distribution. The specific range may include, for example, but not limited to, a range corresponding to −7σ or less and +7σ or more in a normal distribution graph when the distribution of sales prices corresponds to the normal distribution graph. FIG. 4 may be referred for a specific example related to the normal distribution graph.

In some cases, the processor 220 may identify a standard deviation of price of the item corresponding to the sales information. Based on the identified standard deviation, the processor 220 may identify a position of the price of the item in the distribution of average sales prices. When the identified position is out of a predetermined position range, the processor 220 may identify an expected sales volume of the item.

The processor 220 may identify a revenue from sale of the item according to the identified expected sales volume. The processor 220 may identify the revenue according to the identified expected sales volume based on the sales price of the item. For example, the processor 220 may identify the revenue by multiplying a difference between the sales price of the item and the cost of the item by the expected sales volume. In this case, cost information of the item may be information predetermined in the memory 210, but not limited thereto, and may be included in the sales information of the item according to an embodiment.

When a value of the identified revenue is out of a specific range (e.g., 100,000 won or more), the processor 220 may identify that it is necessary to provide item sales management information. Here, a case where the value of the identified revenue is out of the specific range may correspond to the present criterion described above.

For example, in a case where the specific range is 100,000 won or more, if the value of the identified revenue is less than 1000,000 won, the processor 220 may identify that it is necessary to provide the item sales management information.

In an embodiment, based on information on or regarding a selling event of an item, the processor 220 may identify a margin of the selling event. Specifically, when the selling event of the item is identified, the processor 220 may identify a margin corresponding to the selling event. The selling event may include, for example, an order for the item, and the margin may indicate, for example, a difference between a sales price and a cost of the item.

The processor 220 may identify whether the identified margin is included in a specific region within a predetermined margin distribution. The margin distribution may include, for example, a normal distribution for a margin, which is acquired based on sales information of the item sold for a specific period. FIG. 4 may be referred to for an example of the normal distribution. When the identified margin is not included in the specific region, the processor 220 may determine that it is necessary to provide the item sales management information.

In some cases, the processor 220 may identify a standard deviation of the identified margin. The processor 220 may identify a position of the identified margin in the predetermined margin distribution based on the identified standard deviation. When the identified position of the margin is not included in the specific region, the processor 220 may determine that it is necessary to provide the item sales management information.

In an embodiment, the processor 220 may identify a sales volume of the item sold for a specific period (e.g., 5 minutes) based on information on a selling event of the item. The processor 220 may identify whether the identified sales volume is included in a specific region within a predetermined sales volume distribution. When the identified sales volume is not included in the specific region, the processor 220 may determine that it is necessary to provide the item sales management information. Here, the predetermined sales volume distribution may include, for example, a normal distribution generated based on information on a sales volume of the item sold on a unit basis of a specific period (e.g., 5 minutes). That is, the predetermined sales volume distribution may include a normal distribution of the sales volume of the item on a unit basis of the specific period.

In some cases, a sales volume for a specific period may be referred to as a unit sold, but embodiments are not limited to this term.

In an embodiment, the processor 220 may identify a profit rate corresponding to a selling event based on information on the selling event of the item. When the identified profit rate satisfies a specific criterion, the processor 220 may identify an abnormality in the selling event of the item. The profit rate is a value of sales efficiency of the item, and may include, for example, a value obtained by dividing a difference between the sales price and the cost of the item by the cost or a value obtained by multiplying the aforementioned value by 100. The profit rate may be calculated for each item.

The specific criterion associated with the profit rate may include, for example, a case where a profit rate of an item corresponding to sales information is less than a value set based on a profit rate identified for a specific period. In some cases, the specific criterion may include a plurality of criterions. For example, the specific criterion may include a case of having a value less than a minimum profit rate of an item sold for one month and having a value less than 75% of an average profit rate of the item sold for the last 10 minutes.

When it is necessary to provide the item sales management information, the processor 220 may provide the item sales management information generated based on sales information. The item sales management information may include, for example, at least one of: sales price change information of an item; sales status information of the item; distribution information of the item; seller information of the item; sales control information of the item; a sales price of the item; page link information for modifying the sales status information of the item; and manager information of the item.

Here, the sales price change information may include, for example, at least one of: information on or regarding a cause for a price change (e.g., a change by a manager or an automatic change by a system) and information on a price change history. The sales status information of the item may include at least one of: information on a screen displayed on a webpage for a current price of the item and sale of the item; and information on whether the item is sold out or still available. The distribution information of the item may include, for example, information on at least one of: a category of the item, a type of the item, a quantity of the item sold, and a name of the item. The seller information of the item may include, for example, information indicating a seller of the item, and the sales control information of the item may include information associated with sale of the item or information for changing a status. The page link information for modifying the sales status information of the item may include, for example, link information to access a webpage when an additional webpage is required to change the sales status of the item (e.g., sold-out, available for sale).

In an embodiment, a seller of the item may include a subject that supplies the item to sell to a customer, and a manager of the item may include a subject that manages sale of the item based on a contract with the seller of the item. However, the present disclosure is not limited thereto, and, for example, the manager may perform the sale of the item, and, in this case, the manager may include the seller. However, the present embodiment is not limited to this example.

In an embodiment, when it is necessary to provide the item sales management information, the processor 220 may identify receiving device information corresponding to the item. The receiving device information may include information on a predetermined device that is required to provide the item sales management information. The processor 220 may transmit the item sales management information to an identified receiving device.

For example, a receiving device corresponding to a first item may include a first device and a second device, and a receiving device corresponding to a second item may include the first device and a third device. In this case, since an item corresponding to sales information is the first item and it is necessary to provide the item sales management information, the processor 220 may provide the item sales management information to the first device and the second device.

In some cases, a device for receiving the item sales management information may be a device classified based on a device user. Specifically, a receiving device may be a device classified in advance by a category for a user job, a user position, or a user type. For example, the first device may include a device associated with at least one user who manages the sale of the item, the second device may include a device associated with at least one user who supplies the item, and the third device may include a device associated with at least one user who manages delivery of the item. However, this is merely an example and the present embodiment is not limited to this example.

In an embodiment, when it is necessary to provide item sales management information, the processor 220 may identify receiving device information corresponding to each type of item sales management information. For example, receiving device information corresponding to a first type of the item sales management information and receiving device information corresponding to a second type of the item sales management information may be identified. The processor 220 may provide, to a receiving device corresponding to each type, information of a corresponding type among the item sales management information. For example, the processor 220 may provide, to a first device (e.g., all registered devices) corresponding to information of a first type (e.g., simple notification for an abnormality in sale of the item), information of the first type among item sales management information, and may provide, to a second device (e.g., at least user-associated device which manages the sale of the item) corresponding to information of a second type (e.g., the sale of the item), information of the second type among the item sales management information. A type of item sales management information may be predetermined based on at least one of a predetermined security level and a management level, but not limited thereto.

According to an embodiment, a device corresponding to each item or a device corresponding to each types of sales information to be provided may be predetermined. FIG. 8 may be referred for a more specific example related to designation of a device.

In an embodiment, the processor 220 may stop the sale of the item through a network in response to provision of the item sales management information. In some cases, in response to a determination that it is necessary to provide the item sales management information, the processor 220 may stop the sale of the item. To stop the sale of the item, the processor 220 may control a screen of a web page displayed for the sale of the item. For example, the processor 220 may display, on a screen of a web page, an image or text indicating that the item is sold out.

In an embodiment, the processor 220 may identify whether sales information of the item satisfies a predetermined criterion, and when the sales information satisfies the predetermined criterion, an abnormality in a selling event of the item may be identified. That is, when the predetermined criterion is satisfied, the processor 220 may identify that an error (or an abnormal sign) has occurred in the sale of the item. In response to identifying the abnormality (or an abnormal sign), the processor 220 may provide item sales management information. The processor 220 may receive feedback information on the provided item sales management information. In this case, the processor 220 may update the predetermined criterion based on the feedback information. Meanwhile, the feedback information may include information classified as positive or negative, but not limited thereto.

In an embodiment, a criterion for the update may include a threshold value for determining whether to provide item sales management information. The threshold value may be, for example, a reference value that designates a specific region within a price distribution or a margin distribution. As described above, whether it is necessary to provide item sales management information may be determined based on whether a position of a price or margin associated with the item is included in the specific region. In this case, the threshold value may be changed based on feedback information. For example, when the feedback information includes first information (e.g., positive), the threshold may be maintained as a current value, and when the feedback information includes second information (e.g., negative), the threshold value may be adjusted to be reduced for a stricter criterion. A method for adjusting the threshold value to be reduced may be determined in advance. For example, a method of increasing the threshold value by a first value may be included, but the present disclosure is not limited thereto and various methods may be applied.

In an embodiment, the processor 220 may identify whether a predetermined criterion for determining whether to transmit item sales management information is satisfied, based on a machine learning algorithm. In this case, the processor 220 may update the machine learning algorithm by using the feedback information as a response value (or a correct answer value) for learning of the machine learning algorithm. Here, the machine learning algorithm may include an algorithm pre-learned based on whether it is necessary to provide a large amount of data associated with pre-acquired item sales information and item sales management information corresponding to the data, and well-known various machine learning algorithms may be used.

Figure 3:
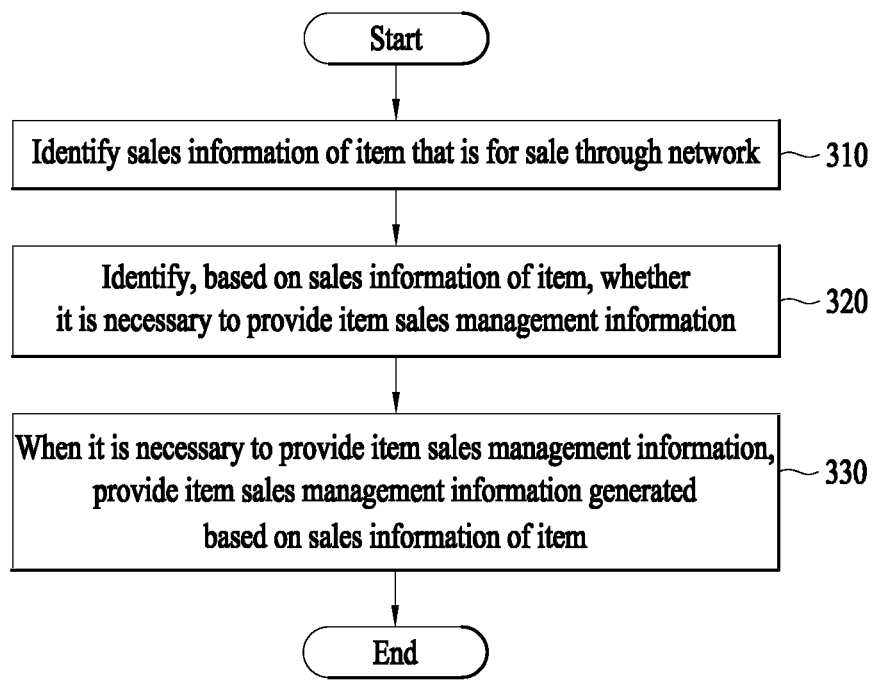
FIG. 3 is a flowchart of a method of an electronic apparatus according to an embodiment.

FIG. 3 is a flowchart of a control method of an electronic apparatus according to an embodiment. Respective operations of the control method illustrated in FIG. 3 may be in some cases performed in an order different from that illustrated. Hereinafter, the repeated contents of those described with reference to FIGS. 1 and 2 will be omitted.

Referring to FIG. 3, in operation 310, an electronic apparatus may identify sales information of an item that is for sale through a network. The sales information of the item is a variety of information associated with the sale of the item and may include at least one of: a sales price of the item; a sales volume of the item; a discount rate of the item; and a margin of the item.

Specifically, the electronic apparatus may identify the sales information of the item based on completion of online sale of the item. In response to sale of items, the electronic apparatus may identify sales information of each item in real time whenever the sale is completed, or may collect sales information of an item sold at a specific time interval and identify the sales information at the specific time interval.

In operation 320, the electronic apparatus may determine whether it is necessary to provide sales management information of the item based on the sales information of the item. In an example, based on the sales information of the item, the electronic apparatus may identify whether at least a part of the sales information of the item satisfies a predetermined criterion. When the predetermined criterion is satisfied, the electronic apparatus may identify that it is necessary to provide item sales management information. When the predetermined criterion is not satisfied, the electronic apparatus may identify that it is not necessary to provide the item sales management information.

The predetermined criterion may include: a first criterion based on a sales price of the item and a revenue according to an expected sales volume; a second criterion based on a margin of the item; a third criterion based on a profit rate of the item; or a fourth criterion based on a sales volume of the item.

In an embodiment, the first criterion may include a case where when a position of a sales price of the item in a predetermined sales distribution is out of a specific region within the predetermined sales distribution, the revenue according to the expected sales volume of the item is identified based on the sales information of the item and then the identified revenue is out of a specific range. In this case, when the position of the sales price of the item in the predetermined sales distribution is included in the specific region within the predetermined sales distribution or when a value of the identified revenue is included in the specific range, the first criterion may not be satisfied.

In an embodiment, the second criterion may include a case where a margin of a selling event of the item is identified and a position of the identified margin in a predetermined margin distribution is out of a specific region. In this case, when the position of the identified margin in the margin distribution is included in the specific range, the second criterion may not be satisfied.

In an embodiment, the third criterion may include a case where a profit rate corresponding to a selling event of the item is identified and a value of the identified profit rate is less than a specific value. In this case, when the value of the identified profit rate is greater than or equal to the specific value, the third criterion may not be satisfied.

In an embodiment, the fourth criterion may include a case where a sales volume for a selling event of the item is identified and a position of the identified sales volume in a predetermined sales volume distribution is out of a specific region. In this case, when the position of the identified sales volume in the sales volume distribution is included in the specific range, the fourth criterion may not be satisfied.

In operation 330, when it is necessary to provide the item sales management information, the electronic apparatus may provide the item sales management information, which is generated based on the sales information of the item. Here, the item sales management information may include at least a part of the sales information of the item (e.g., the sales price of the item), and, in some cases, may include information for sales management of the item. The information for sales management of the item may include, for example, sales control information of the item, page link information for modifying sales status information of the item, and manager information of the item, but not limited thereto.

Specifically, for example, the sales management information of the item may include at least one of: sales price change information of the item; the sales status information of the item; distribution information of the item; seller information of the item; sales control information of the item; a sales price of the item; page link information for modifying the sales status information of the item; and manager information the item.

In an embodiment, in response to a determination that it is necessary to provide the item sales management information, the electronic apparatus may transmit the item sales management information to a predetermined receiving device. The receiving device may be, for example, a device predetermined for each item corresponding to sales information. In some cases, the receiving device may be divided into various devices included in item sales management information and set in advance.

FIG. 4 is a diagram illustrating distribution for determining whether to provide item sales management information by an electronic apparatus according to an embodiment. Specifically, FIG. 4 is a diagram for explaining a distribution (e.g., a sales price distribution or a margin distribution) used to determine whether it is necessary to provide item sales management information described with reference to FIG. 2 or 3.

Referring to FIG. 4, the distribution may include a graph indicating a shape in which data is scattered around the central axis (e.g., an axis corresponding to a horizontal axis value of 0). In FIG. 4, the distribution may appear similar to a normal distribution graph, but this is merely an example and the distribution may appear in a different shape or in a different form depending on used data.

The central axis of the distribution may be an average value of all data used to generate the distribution, and the central axis of the distribution is indicated as 0 in FIG. 4, but not limited thereto.

In an embodiment, whether to provide item sales management information may be determined based on whether the sales price of the item is included in a specific region of a predetermined price distribution. In this case, the specific region of the price distribution may be, for example, a region corresponding to $-4\sigma$ or less or $+4\sigma$ or more on the distribution, as shown in FIG. 4. In this case, when a position corresponding to the sales price of the item on the distribution is included in the region corresponding to $-4\sigma$ or less or $+4\sigma$ or more on the distribution, it may be determined that it is necessary to provide item sales management information.

In an embodiment, whether to provide the item sales management information may be determined based on whether a margin of the item is included in a specific region within a predetermined margin distribution. In this case, the specific region within the margin distribution may be, for example, a region corresponding to $-4\sigma$ or less or $+4\sigma$ or more in the distribution, as shown in FIG. 4. In this case, when a position corresponding to the margin of the item on the distribution is included in the region corresponding to $-4\sigma$ or less or $+4\sigma$ or more on the distribution, it may be determined that it is necessary to provide item sales management information.

Meanwhile, the above embodiment is an example for explaining a distribution in relation to FIG. 4, and the present specification is not limited thereto. In addition, X axis, Y axis, and generation of the graph in FIG. 4 may be understood to correspond to a normal distribution.

FIG. 5 is a diagram illustrating an example of item sales management information provided by an electronic apparatus according to an embodiment.

The item sales management information may include distribution information of an item, sales status information of the item, sales price change information of the item, sales control information of the item, a sales price of the item, manager information of the item, page link information for modifying the sales status information of the item, and information for determining feedback on the item.

Referring to FIG. 5, the distribution information of the item may include an item category field indicated as "digital", an item identification number field indicated as "123456789", and an item information field indicated as "KK tablet". The sales status information of the item may include an item status field indicated as "profit rate reduced by 582%". The price change information of the item may include a cause field to display a profit rate, a sales price, an expected number of sales (or a sales volume), and an expected loss amount. The sales control information of the item is information that can change in relation to sale of the item, and may appear with a link information field.

In an embodiment, an underlined text included in the link information field may indicate a link itself, and a screen (or information, website) for controlling the sales may be displayed in response to an input thereto.

For example, "Sales status" in the link information field may include page link information through which information provided for the sale of the item can be checked. That is, the "sales status" may include a link connecting a screen to a website where the item is for sale. In this case, the screen for the website which offers the item for sale may be displayed in response to an input to "Sales status".

Figure 6:
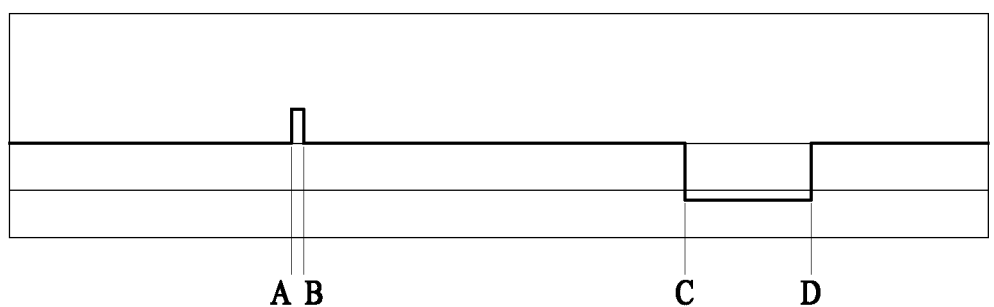
FIG. 6 is a diagram illustrating an example of information associated with a sales price of an item among item sales management information provided by an electronic apparatus according to an embodiment.

"Price change" in the link information field may include a link with information more specifically indicating information on or regarding which a price of the item is changed. In this case, information indicating a price change history may be displayed in response to an input to "Price change". FIG. 6 or 7 may be referred for an example of information displayed using a link.

"Distribution information" in the link information field may include a link with more specific information associated with distribution of the item. For example, the distribution information may include at least some of a remaining quantity of the item, a type of the item, a size of the item, and a name of the item, and, in some cases, may include distribution information (e.g., an item category field) displayed in FIG. 5.

"Sales management" in the link information field may include a page link for modifying the sales status information of the item. In this case, a screen on which the sales status information of the item can be modified may be displayed in response to an input to "Sales management". FIG. 9 may be referred for an example of a screen on which sales status information can be modified.

In an embodiment, the manager information may include information on a predetermined manager in charge of management of the item. People belonging to various teams may be involved in management of a single item, and, in this case, information on the teams (e.g., Team A, Team B) may be displayed in the manager information as illustrated. In some cases, the predetermined manager may be classified by job title and assigned to the item, and, in this case, information on the job title may be displayed in the manager information.

A feedback field of FIG. 5 may include a field which requires a user's input in response to identifying of item sales management information provided. For example, regarding the item sales management information, an input corresponding to GOOD in the provided feedback field may be received based on properly detecting an abnormal situation associated with sale of the item. When the item sales management information is provided but no abnormal situation associated with the sale of the item occurs, an input corresponding to "BAD" in the feedback field may be received. Such an input corresponding to the feedback field may be collected by an electronic apparatus and used as data for updating a criterion for determining whether to provide item sales management information.

In an embodiment, item sales management information of FIG. 5 may be displayed on another electronic apparatus based on transmission of the item sales management information from the electronic apparatus to another electronic apparatus (e.g., a receiving device). However, the present disclosure is not limited thereto, and the item sales management information may be displayed on the electronic apparatus itself according to an embodiment.

In an embodiment, at least a part of the item sales management information may be associated with a different receiving device. For example, a category field and a status field of item sales management information may be associated with a receiving device corresponding to a first manager (e.g., JENNY), and link information may be associated with a second manager (e.g., RINDA). In this case, the electronic apparatus may provide information corresponding to the category field and the status field in the item sales management information to the receiving device corresponding to the first manager. The electronic apparatus may provide information corresponding to the link information to the receiving device corresponding to the second manager.

As such, a receiving device to receive item sales management information may be diversified according to an embodiment, which may be set in advance. FIG. 8 may be referred for a more detailed description related to the setting of the receiving device.

FIG. 6 is a diagram illustrating an example of information associated with a sales price of an item among item sales management information provided by an electronic apparatus according to an embodiment.

According to FIG. 6, information indicating change of a sales price of an item over time may be provided. The information corresponding to FIG. 6 may be provided in response to receiving an input to "Price change" of a link field, as described with reference to FIG. 5.

FIG. 6 illustrates change of a price of an item corresponding to an input within a specific period. The specific period is a predetermined period and may correspond to, for example, one week or one month. Referring to FIG. 6, it can be seen that the sales price of the item increased during a period from a time point A to a time point B within the specific period. In addition, it can be seen that the sales price of the item decreased during a period from a time point C to a time point D within the specific period.

Sales information corresponding to the received input may be located at the very beginning or the end on the horizontal axis in which the time points A, B, C, and D of FIG. 6 are listed, but this is only an example, and the present embodiment is limited to this example.

In some cases, the form of price change information as shown in FIG. 6 may also be used to indicate change of a profit rate or change of an expected loss amount. For example, at least one of information on change of a profit rate for a specific period and information on change of an expected loss amount may be provided in a similar manner along with the sales price change information corresponding to FIG. 6.

In addition, although the price change information is shown in the form of a simple graph in FIG. 6, the present disclosure is not limited thereto and various methods may be used such as displaying detailed information about a changed price together.

FIG. 7 is a diagram illustrating another example of information associated with a sales price of an item among item sales management information provided by an electronic apparatus according to an embodiment. Specifically, FIG. 7 illustrates an example of providing information on a part of a period indicating a price change, shown in FIG. 6, in a different form.

Referring to FIG. 7, information associated with a sales price of an item may be displayed in the form of a table. According to FIG. 7, a sales volume, information on or regarding a price to be changed at a specific time point (e.g., 20/06/08 13:00:00), information on a market price, information on a delivery fee of the item, and information on a discount price may be displayed in addition to the sales price of the item.

Here, the information on the price to be changed may indicate, for example, information on a price change when the price change is determined. The market price is information on a market price of an item corresponding to sales information, and may be a predetermined value.

In addition, in some cases, information on a subject that has caused a price change may be displayed as shown. Specifically, when the price change automatically occurs by a system, information "System" may be displayed, and when the price change occurs by a specific manager, information indicating the specific manager (e.g., "A") may be displayed.

In FIG. 7, information on two time points (e.g., 20/06/08 13:00:00, 20/06/08 12:50:00) is shown, but this is merely an example, and information on more time points may be displayed.

FIG. 8 is a diagram illustrating an example of information associated with a manager among item sales management information provided by an electronic apparatus according to an embodiment.

Referring to FIG. 8, a manager who will be provided with at least a part of item sales management information for each item may be predetermined. For example, JENNY may be set to receive item sales management information for items associated with Kitchen and Kitchen Appliance. JAKE may be set to receive item sales management information for items associated with Kitchen and Kitchen Disposable.

In an embodiment, a unit in FIG. 8 (e.g., Unit 1 and Unit 2) may represent an item itself. However, the present disclosure is not limited thereto and, for example, a unit may represent a category to which an item belongs.

In addition, Unit 1 or Unit 2 are terms for distinguishing different units, and the present embodiment is not limited to these terms.

According to FIG. 8, information (e.g., MAYA) on a person who has set a manager (e.g., JENNY and JAKE) associated with each item may be displayed in a creator field. Change of a manager associated with each item may be made through an input of "Delete" button.

In an embodiment, in order to search for a manager for each item, an input may be applied to selection box fields respectively associated with Unit 1, Unit 2, a user type, and user ID (e.g., boxes which are displayed in parallel with Unit 1, Unit 2, User type, and User ID). In this case, a manager for each item may be searched based on the input. For example, when Kitchen is input in a selection box for Unit 1, information on various managers of which Unit 1 is set to Kitchen may be displayed, and, in this case, JENNY and JAKE may be displayed since Unit 1 of each of JENNY and JAKE is set to Kitchen.

FIG. 9 is a diagram for describing a case where sale of an item is managed based on item sales management information provided from an electronic apparatus according to an embodiment. Specifically, FIG. 9 illustrates an example of information provided for item sales management.

In an embodiment, FIG. 9 may include a screen displayed in response to reception of an input to "Sales management" in the link field of FIG. 5. In this case, an item manageable through FIG. 9 may include an item corresponding to sales information.

Referring to FIG. 9, in order to manage sale of an item, a screen for changing information on or regarding the item and information associated with the sale of the item may be provided. The information on the item may include, for example, a name set to represent the item (e.g., a name of VenderItem field, a name of SKU field), a current sales status, and an identification number corresponding to the item (e.g. a number of Product/Item). Change of information associated with the sale of the item may be performed through an area appearing below "Sales information".

For example, a sales price of the item may be changed by changing a number regarding an area corresponding to a sales price field. A period during which the sale of the item is maintained may be changed by changing a date or period regarding an area corresponding to a sales period field. If the corresponding period has passed or has not yet to come, information for the sale of the item may not be provided. Whether to maintain the sales status of the item or stop the sale of the item may be determined through selection of an area corresponding to the sales status field. For example, when "Valid" field is selected, the sale of the item may be maintained, and when "Invalid" field is selected, the sale of the item may be stopped.

In an embodiment, when a user who has received item sales management information determines that an error has occurred in the sale of the item, information associated with the sale of the item may be modified by accessing a page corresponding to FIG. 9 and applying an input. For example, the sale of the item may be stopped or the sales price of the item may be changed through an input associated with the page corresponding to FIG. 9.

According to the present disclosure, the electronic apparatus and the method thereof verify whether an abnormal symptom has occurred in relation to sale of an item based on sales information of the item, and provide item sales management information accordingly, thereby effectively managing an abnormal situation possibly occurring in relation to the sale of the item.

In addition, if the sales volume of the product fluctuates abnormally compared to a general situation, or if a margin or revenue drops abnormally, the electronic apparatus and the method thereof causes item sales management information to be provided, so that management for the sale of the item is performed efficiently.

The electronic apparatus or terminal according to the above-described embodiments may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. Those terms may include software routines in conjunction with processors, etc.

The above-described embodiments are only examples, and other embodiments may be implemented within the scope of the following claims.

What is claimed is:

1. A method operable by an electronic apparatus to provide information, the method comprising:

receiving, over a network and from a server associated with a web user interface (UI) configured for selling at least one item through the network, data relating to a plurality of sales of the at least one item, the received data comprising a plurality of aggregated data collected at a plurality of predetermined intervals of time, each of the aggregated data comprising an average selling price of the at least one item from the respective predetermined interval of time;

determining, a first detection module among a plurality of detection modules of the electronic apparatus, wherein the plurality of detection modules of the electronic apparatus are implemented via a distributed group of networked devices in data communication with one another, each of the plurality of detection modules having different criterion for determining whether to provide item sales management information, each of the different criterion being related to a specific predetermined sales distribution, a specific predetermined reference time, and a specific predetermined specific range, the first detection module having a first criterion;

determining, using the first detection module, whether it is necessary to provide item sales management information based on a machine learning algorithm, wherein the item sales management information is generated based on sales information of the at least one item, wherein determining whether it is necessary to provide the item sales management information comprises:

monitoring the received data, identifying, in real time, based on the received data, the sales information of the at least one item, the sales information comprising a selling price of the at least one item, applying the first criterion to the sales information of the at least one item based on the machine learning algorithm, identifying, using the machine learning algorithm, one or more abnormalities, associated with the first criterion, in the sales information of the at least one item based on monitoring the received data, and in response to identifying the one or more abnormalities in the sales information of the at least one item, generating the item sales management information;

in response to determining that it is necessary to provide the item sales management information, identifying a first receiving device among a plurality of receiving devices in data communication with the electronic apparatus based on a type of the item sales management information, wherein each of the plurality of receiving devices is associated with a particular type of item sales management information, wherein the first receiving device is associated with the type of the item sales management information, wherein the type of the item sales management information is predetermined based on a security level related to the item sales management information;

transmitting a set of data to the first receiving device over the network, the set of data configured to cause a device UI to be displayed on the first receiving device, the device UI configured to (a) receive a first user input for training the machine learning algorithm and (b) provide a link to a menu for receiving a second user input for adjusting at least a portion of the web UI for the selling of the at least one item;

training the machine learning algorithm to improve its capability regarding identification of the one or more abnormalities based on the first user input; and adjusting, based on the second user input, at least the portion of the web UI and cooperating with the server associated with the web UI to stop selling of the at least one item, wherein applying the first criterion to the sales information of the at least one item based on the machine learning algorithm comprises:

determining whether a position of the selling price is outside of a specific region within a predetermined sales distribution related to the first criterion;

identifying an expected sales volume of the at least one item based on a quantity of the at least one item sold for a predetermined reference time related to the first criterion; and identifying an expected revenue from sale of the at least one item based on the selling price and the expected sales volume, wherein the one or more abnormalities comprises the expected revenue being out of a predetermined range related to the first criterion.

2. The method of claim 1, wherein the predetermined sales distribution related to the first criterion comprises price distribution information related to the selling price of the at least one item, wherein the price distribution information is generated based on a sales history of the at least one item over a predetermined period of time.

3. The method of claim 1, wherein:
the item sales management information comprises at least one of: selling price change information of the at least one item; sales status information of the at least one item; distribution information of the at least one item; seller information of the at least one item; sales control information of the at least one item; a selling price of the at least one item; page link information for modifying the sales status of the at least one item; or manager information of the at least one item; and
the selling price change information of the at least one item comprises information regarding a cause for change of the selling price of the at least one item.

4. The method of claim 1, wherein the transmitting of the set of data to the first receiving device comprises:
identifying information associated with the first receiving device; and
transmitting the set of data to the first receiving device based at least in part on the information associated with the first receiving device.

5. The method of claim 1, wherein:
the adjusting of at least the portion of the web UI comprises adjusting the web UI to stop selling of the at least one item on the web UI.

6. A non-transitory computer readable storage medium having stored thereon instructions that, when executed, cause a computer to perform the method of claim 1.

7. An electronic apparatus, comprising:
a memory configured to store instructions; and
a processor,
wherein the processor is connected to the memory and configured to:
receive, over a network and from a server associated with a web user interface (UI) configured for selling at least one item through the network, data relating to a plurality of sales of the at least one item, the received data comprising a plurality of aggregated data collected at a plurality of predetermined intervals of time, each of the aggregated data comprising an average selling price of the at least one item from the respective predetermined interval of time;
determine, a first detection module among a plurality of detection modules of the electronic apparatus, wherein the plurality of detection modules of the electronic apparatus are implemented via a distributed group of networked devices in data communication with one another, each of the plurality of detection modules having different criterion for determining whether to provide item sales management information, each of the different criterion being related to a specific predetermined sales distribution, a specific predetermined reference time, and a specific predetermined specific range, the first detection module having a first criterion;
determine, using the first detection module, whether it is necessary to provide item sales management information based on a machine learning algorithm, wherein the item sales management information is generated based on sales information of the at least one item, wherein to determine whether it is necessary to provide the item sales management information, the processor is further configured to:
monitor the received data,
identify, in real time, based on the received data, the sales information of the at least one item, the sales information comprising a selling price of the at least one item,
apply the first criterion to the sales information of the at least one item based on the machine learning algorithm,
identify, using the machine learning algorithm, one or more abnormalities, associated with the first criterion, in the sales information of the at least one item based on monitoring the received data, and
in response to identifying the one or more abnormalities in the sales information of the at least one item, generate the item sales management information;
in response to determining that it is necessary to provide the item sales management information, identify a first receiving device among a plurality of receiving devices in data communication with the electronic apparatus based on a type of the item sales management information, wherein each of the plurality of receiving devices is associated with a particular type of item sales management information, wherein the first receiving device is associated with the type of the item sales management information, wherein the type of the item sales management information is predetermined based on a security level related to the item sales management information;
transmit a set of data to the first receiving device over the network, the set of data configured to cause a device UI to be displayed on the first receiving device, the device UI configured to (a) receive a first user input for training the machine learning algorithm and (b) provide a link to a menu for receiving a second user input for adjusting at least a portion of the web UI for the selling of the at least one item;
train the machine learning algorithm to improve its capability regarding identification of the one or more abnormalities based on the first user input; and
adjust, based on the second user input, at least the portion of the web UI and cooperate with the server associated with the web UI to stop selling of the at least one item,
wherein to apply the first criterion to the sales information of the at least one item based on the machine learning algorithm, the processor is further configured to:
determine whether a position of the selling price is outside of a specific region within a predetermined sales distribution related to the first criterion;
identify an expected sales volume of the at least one item based on a quantity of the at least one item sold for a predetermined reference time related to the first criterion; and
identify an expected revenue from sale of the at least one item based on the selling price and the expected sales volume, wherein the one or more abnormalities comprises the expected revenue being out of a predetermined range related to the first criterion.

\* \* \* \* \*